United States Patent [19]

Petretti

[11] 4,436,622

[45] Mar. 13, 1984

[54] EDUCTOR TRUCK

[75] Inventor: Anthony V. Petretti, Whitestone, N.Y.

[73] Assignee: Metro Hoist & Body Co., Inc., Whitestone, N.Y.

[21] Appl. No.: 478,356

[22] Filed: Mar. 24, 1983

Related U.S. Application Data

[62] Division of Ser. No. 40,551, May 21, 1979, Pat. No. 4,389,314.

[51] Int. Cl.³ .......................... B01D 21/00; C02C 1/18
[52] U.S. Cl. .................................. 210/232; 210/241; 210/257.1
[58] Field of Search ...................... 210/241, 232, 257.1

[56] References Cited

U.S. PATENT DOCUMENTS

| 1,345,531 | 7/1920 | Cartwright | 210/241 |
| 2,010,538 | 8/1935 | Evans | 210/241 X |
| 3,317,049 | 5/1967 | Petretti | 210/241 X |
| 4,308,139 | 12/1981 | Piepho | 210/241 |

Primary Examiner—John Adee
Attorney, Agent, or Firm—Joseph J. Previto

[57] ABSTRACT

An eductor truck for removing debris from catch basins which is provided with adequate storage facilities, improved safety features and improved door opening features.

1 Claim, 6 Drawing Figures

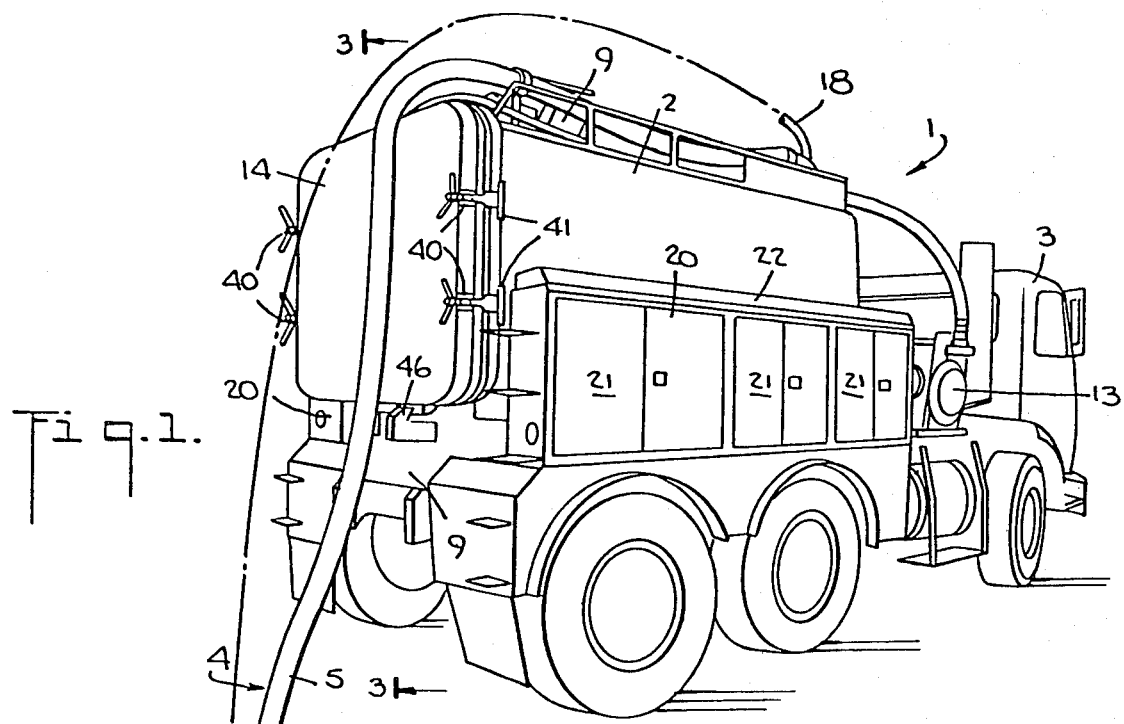
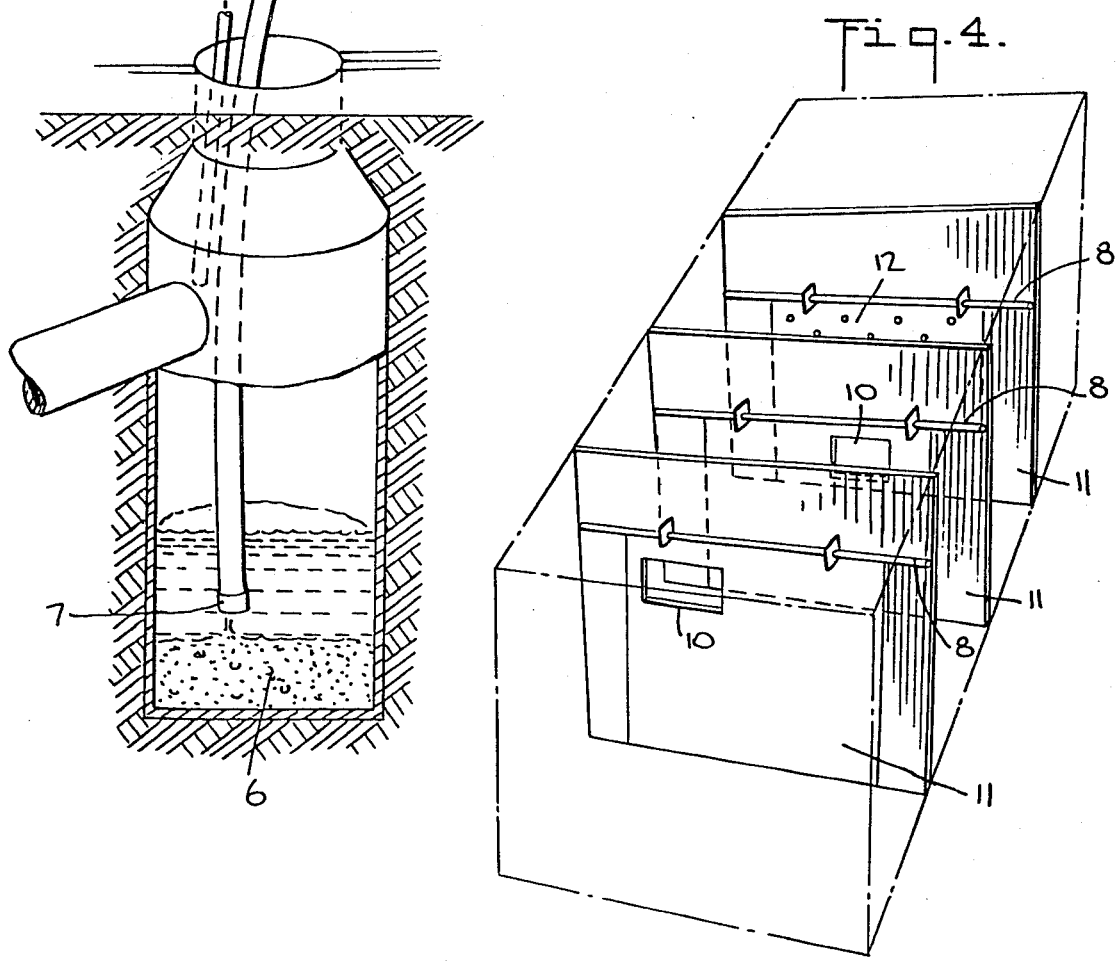

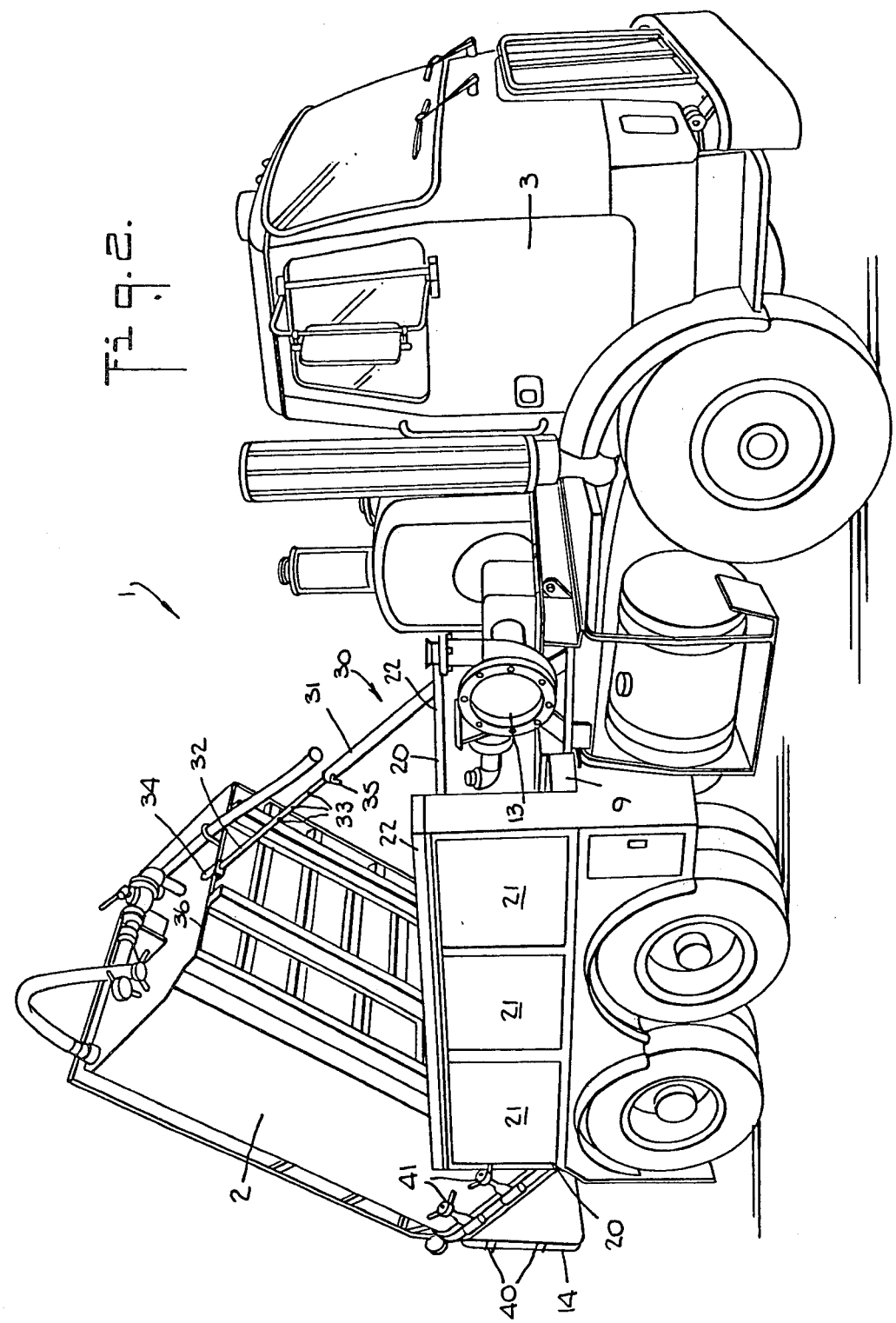

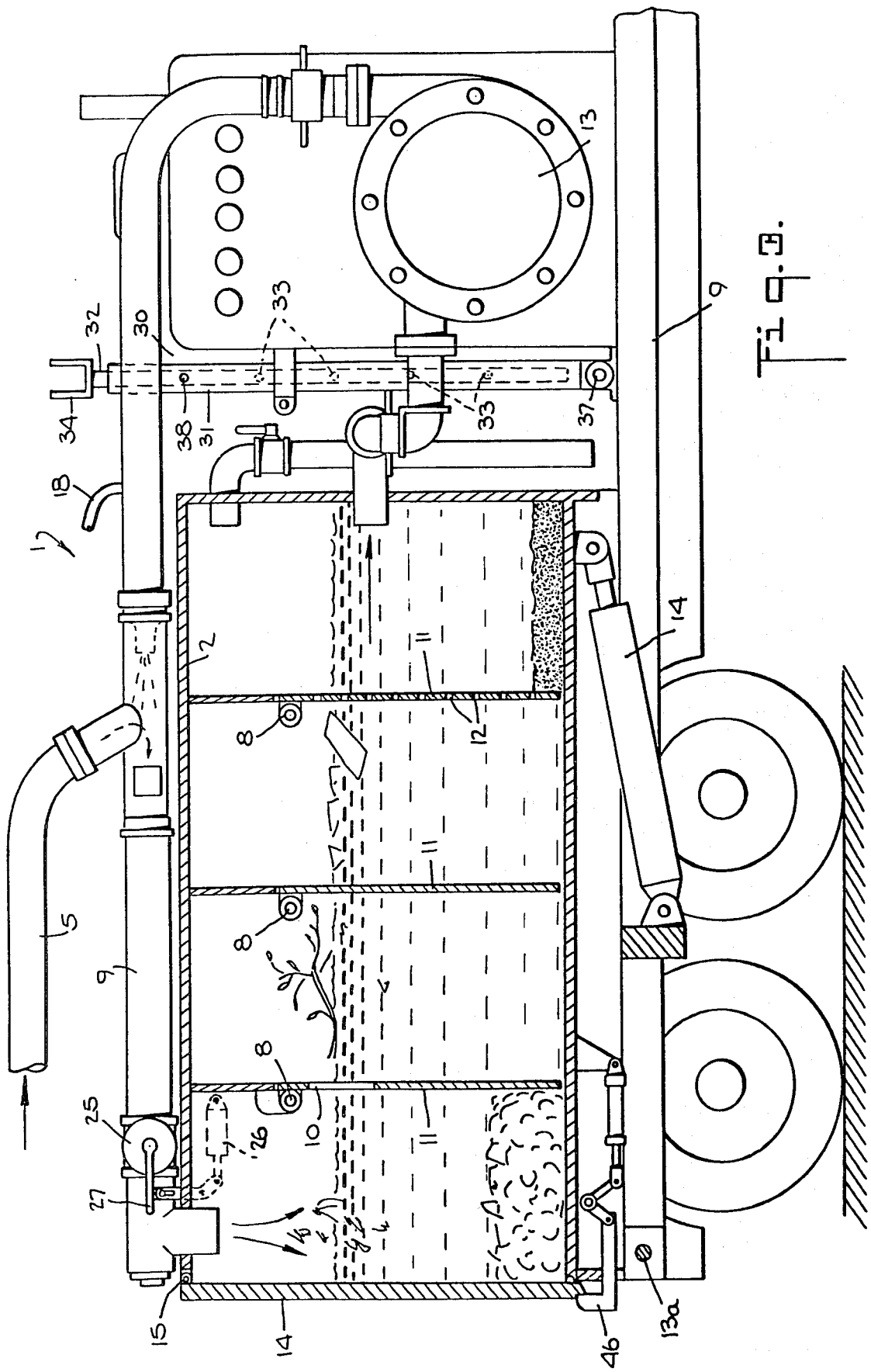

EDUCTOR TRUCK

This application is a division of U.S. application Ser. No. 040,551, filed May 21, 1979, now U.S. Pat. No. 4,389,314.

DESCRIPTION

The present invention is directed to a flush tank eductor truck and more particularly to a flush tank eductor truck which is adapted to siphon debris, etc., from catch basins, to store the debris within its settling tank and to thereafter dump the debris into a suitable dump area.

Eductor trucks are used to siphon debris which may be mixed with a fluid, such as water, from sewers, catch basins, etc. and to deposit the mixture of fluid and debris into a suitable settling tank, preferably mounted on the truck which is then transported to a suitable dump and disposed of.

In cases where the debris is substantially dry, the eduction unit deposits a fluid into the sewer or catch basin in order to loosen the debris and to mix it with the fluid so that it will be easily siphoned-off by the eduction unit. The mixture is deposited in the settling tank where the heavier debris falls to the floor. The fluid with the lighter debris in suspension passes through a series of baffles and/or strainers so that the lighter debris is removed from the fluid. The fluid (which is now relatively free of debris) is re-deposited into the catch basin and re-used to loosen and mix with additional debris.

In such eductor trucks, there has been a scarcity of space for tools, equipment, hoses and other materials necessary for effective operation. In addition, it has been difficult to insure that the settling tank remains suspended when it is raised during maintainance. Furthermore, it has been awkward for the eduction unit to be operated by the operator without climbing up to the top of the truck. In addition, the means for opening the settling tank to permit dumping has been difficult and awkward.

The present invention avoids these difficulties and has for one of its objects the provision of an improved eductor truck which has means to hold the rear door closed until it is to be opened.

Another object of the present invention is the provision of an improved eductor truck which has means to permit storage of tools, etc. without interfering with the operation of the settling tank.

Another object of the present invention is the provision of an improved eductor truck which has improved safety features for holding the settling tank in its raised position during maintainance operation.

Another object of the present invention is the provision of an improved eductor truck which has improved means for automatically operating the eductor unit.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view of a truck having an eduction unit embodying the present invention;

FIG. 2 is a perspective view showing the truck with the settling tank in a raised position;

FIG. 3 is a sectional view taken along line 3—3 of FIG. 1;

FIG. 4 is a perspective fragmentary view of the interior of the settling tank;

Figure 5:
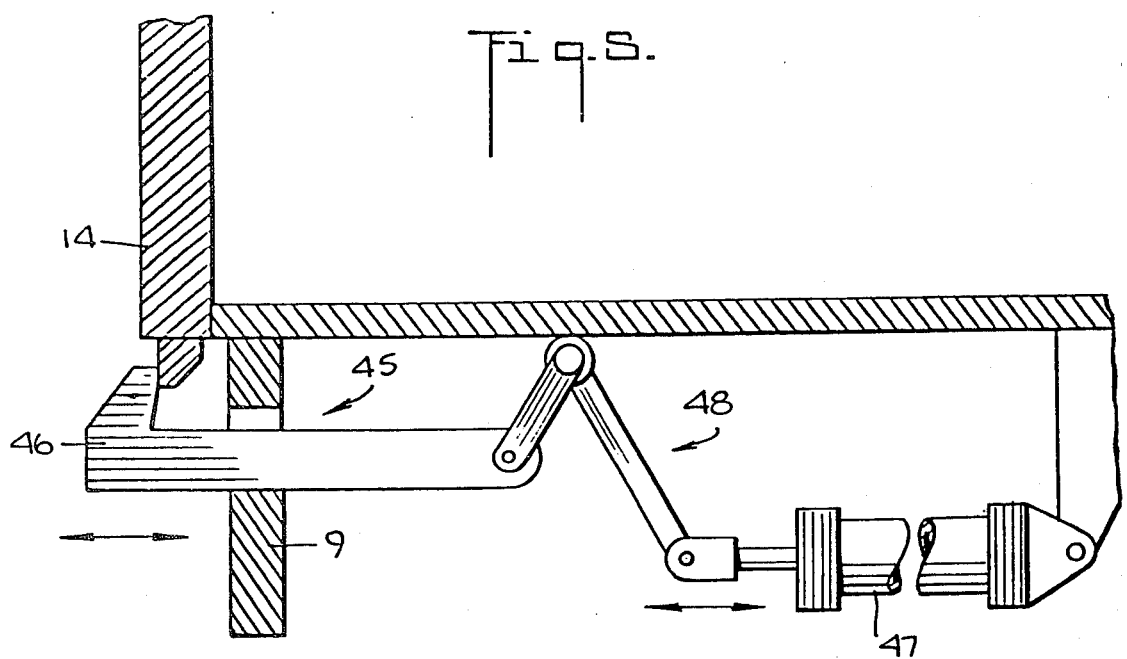
FIG. 5 is a side view of the rear door latch-release mechanism.

Referring to the drawings and more particularly to FIG. 1, a truck 1, usually called an eductor truck because it include an eduction unit 4, comprises a settling tank 2, a front cab 3 and rear frame 9. The truck 1 is provided with the usual eduction mechanism, generally designed by the reference numberal 4. The eduction mechanism 4 comprises a suction pipe 5 having a nozzle 7 mounted on its lower end which is adapted to siphon a fluid, such as water, from a catch basin 6. The hose 5 is adapted to remove the mixture of debris and fluid from the catch basin 6 and to deposit it into the settling tank 2 through a discharge pipe 9 (FIG. 3). A smaller spray hose 18 is provided to permit the user to loosen debris in the basin 6.

The settling tank 2 is also provided with one or more interior baffle plates 11. Each baffle plate 11 (FIGS. 3 and 4) is mounted to swing on a pivot 8 and has one or more openings 10 therein. With this structure the heavier debris will fall to the bottom of settling tank 2 and the lighter debris in suspension will be carried by the fluid through the openings 10. The openings 10 may be staggered and may be adjusted by slidable doors (not shown) to regulate the flow of the fluid threrethrough.

A strainer unit 12 is provided on a forward baffle 11 to remove the lighter debris from the fluid before the fluid is passed through pump 13 to the pressure pipe 5 to be re-used.

With this structure the mixture of debris and fluid is deposited at the rear of the settling tank 2 and passes forwardly through baffles 11 and strainer 12. The heavy debris drops to the bottom of the tank 2 and the lighter debris in suspension passes through the openings 10 in baffles 11 and the openings in the strainer 12. The strainer 12 will filter the finer debris from the fluid and permit the fluid to pass through.

When the settling tank 2 is to be cleaned out. the tank 2 is pivoted and lifted upwardly around pivot 13 by a hydraulic cylinder 14 located therebeneath. The rear door 14 swings open around upper pivot 15 and the baffles 11 swing open on pivots 8 to permit the debris to be cleaned out.

As shown in the drawings, the settling tank 2 is positioned between a pair of storage cabinet unit 20 located on each side thereof. The cabinet units 20 may have suitable doors 21 to permit access thereto to permit tools, extra hoses and other equipment to be stored in the cabinets 20. Since the settling tank 2 is positioned between the two cabinet units 20, the operation and lifting of the tank 2 will not be interferred with. The top of the storage cabinets 20 may have a walkway 22 which will permit the operator to climb up to the top of the settling tank, if necessary.

An eductor unit control valve 25 (FIG. 3) is positioned near the rear end of the top of the settling tank to control operation of the eductor unit. This valve 25 is controlled by a hydraulic cylinder 26 mounted along the side of the settling tank 2 with its control arm 27 attached to the piston of cylinder 26. The hydraulic cylinder 26 is controlled by any known remote means (not shown) by the operator of the truck. Hence, the operation of the eduction unit is operated remotely without the necessity of the operator climbing to the top of the settling tank 2 to operate the valve 25.

When the settling tank 2 is raised, especially for maintenance purposes, a safety holding arm mechanism 30 is used to insure that the tank 2 will not drop should there be a failure in the hydraulic device 14. This safety arm 30 comprises an outer lower tube 31 pivotally mounted to the frame 9 at 37. An extendable rod 32 is telescopically mounted within the tube 31 and is provided with a holding fork 34 at its upper end. A series of openings 33 are provided in the arm 32 and an opening 38 is provided in tube 34 so that a pin 35 (FIG. 2) may be inserted through opening 38 into a selected opening 33 to hold the arm in its raised position. After the fork 34 is inserted beneath an edge 36 of the settling tank 2 it is held in place by pin 35 extending through openings 38 and 33 to support the tank in its upright position.

In order to open the rear door 14 of the tank 2, a plurality of fastening devices 40 in the form of lag screws are mounted on swingable pivots 41 are provided around the door 14. Before the tank 2 is tilted upwardly, these fastening devices 40 are loosened by the operator and swung away from the door around the pivots 41 to release the door 14.

Figure 6:
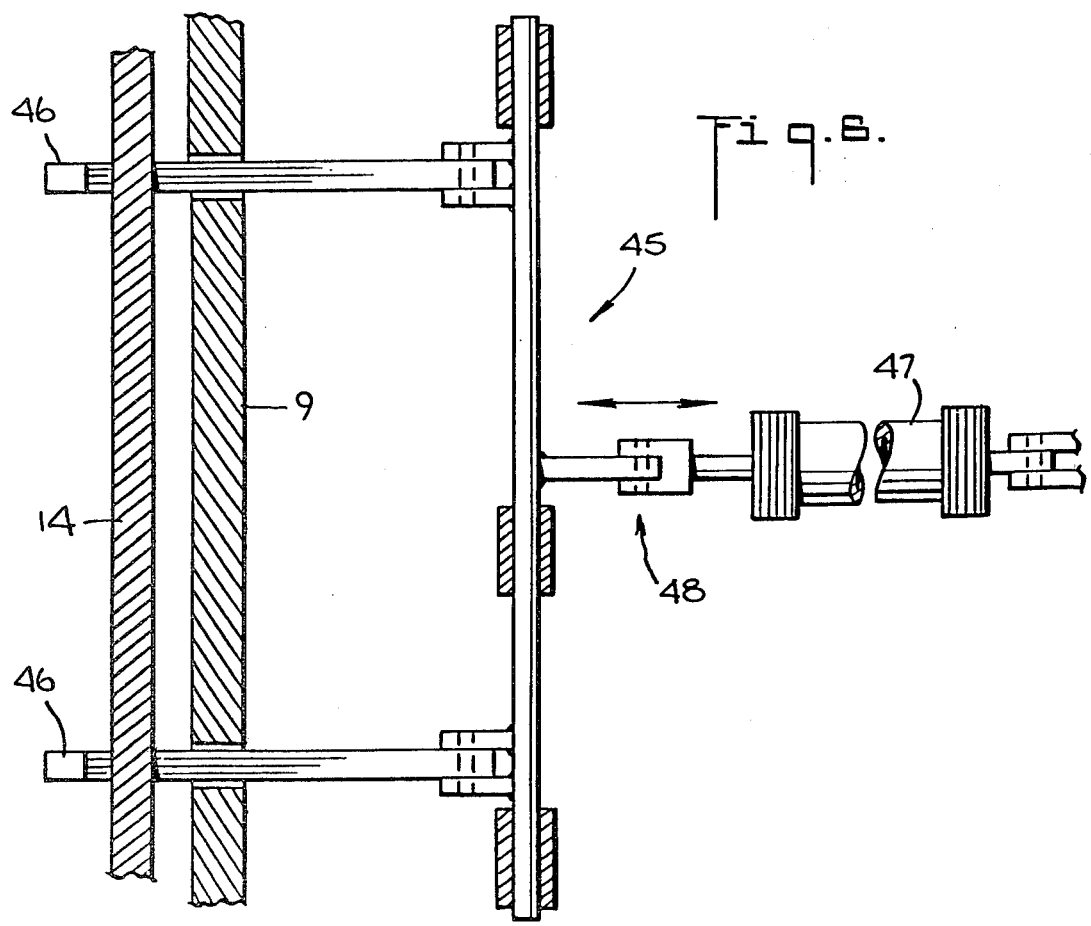
FIG. 6 is a top view thereof.

However, to prevent the rear door 14 for opening until the tank is in its fully upwardly tilted position, a safety latch mechanism 47 (FIGS. 5 and 6) is provided beneath the rear door 14. This latch mechanism 45 comprises latch arms 46 which extend through rear frame element 9 to hold the rear door 14 in place. The latch arms 46 are connected to a control unit operated by an hydraulic cylinder 47 through linkage system 48. Under normal conditions the latch arms 46 are in their forward position to hold the door 14 tightly closed. After the fastening devices 40 have been loosened and the settling tank 2 has been lifted, the hydraulic motor 47 is activated to move the latch arms 46 away from the door 14 thereby permitting the door 14 to swing open around pivot 15. Hence, the rear door 14 will remain tightly closed until after the settling tank is lifted.

It will thus be seen that the present invention provides an improved eductor truck which has means for preventing the rear door from swinging open and means to hold the rear door closed until it is to be opened as well as means to permit storage to tools, etc. without interfering with the lifting operation and is provided with safety features for holding the truck in its raised position as well as improved means for remotely operating the eduction units.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. An eductor truck comprising a frame, a settling tank pivotally mounted on said frame, said settling tank having an eductor unit thereon, storage unit means mounted on said frame on each side of said settling tank, means for lifting said settling tank relative to said frame and between said storage means whereby the storage means will not interfere with said lifting operation, said lifting means comprising hydraulic means mounted beneath said settling tank and between said storage means, a walkway located above each of said storage means, a control valve mounted on said settling tank for operating said eductor unit, said control valve being operable from a point remote from its position on the settling tank, a hydraulic motor mounted adjacent the settling tank to operate the control valve, the hydraulic motor being remotely controlled, said settling tank having a rear door which is pivotally mounted to open, holding devices mounted around the door to hold the door closed and releasable latch means being provided to prevent the door from being opened after the holding devices are removed, said latch means comprising a latch arm movable from a position against the door to hold the door closed to a position away from the door to allow the door to swing open, said latch arm being hydraulically operated by a hydraulic motor from a position beneath the settling tank, said hydraulic motor being mounted on and depending from said settling tank and located between said storage means and a pivotally mounted, telescopically extendable tank supporting means mounted on said frame forward of said settling tank movable to a position beneath the settling tank when it is tilted to hold the tank up should said hydraulic motor fail.

* * * * *